Oct. 12, 1948.  P. J. COSTA  2,450,882
DETONATION SUPPRESSION SYSTEM
Filed March 22, 1944  3 Sheets-Sheet 1

INVENTOR
PHILIP J. COSTA
BY
ATTORNEY.

INVENTOR
PHILIP J. COSTA
BY
his ATTORNEY.

Patented Oct. 12, 1948

2,450,882

UNITED STATES PATENT OFFICE 2,450,882

DETONATION SUPPRESSION SYSTEM

Philip J. Costa, Franklin Square, N. Y., assignor to The Sperry Corporation, a corporation of Delaware Application March 22, 1944, Serial No. 527,640

39 Claims. (Cl. 123—119)

This invention relates to improvements in apparatus and methods for controlling the combustion conditions of prime movers, with particular reference to a combustion mixture controller responsive to abnormal or detonating conditions within the cylinders of an internal combustion engine, and effective to permit the operation of such engine at the maximum obtainable power output per unit of fuel supplied without creating unsafe combustion conditions within the cylinders of the engine, or damaging the structure of the engine.

Although this invention permits the operation of any internal combustion engine to better advantage, it has special value when used to control the operation of aircraft engines because the material used in the construction of such engines makes them especially susceptible to damage or even to destruction by the engine detonation which may accompany overload conditions or unsuitable characteristics in the fuel supplied to the engine. For this reason, the invention has been described herein specifically as applied to an aircraft engine, though its use is in no wise thus limited. The serious consequences which result from the occurrence of excessive detonation within the cylinders of internal combustion engines, frequently accompanied by total failure of the engine, have caused a great deal of attention to be devoted to the problem of limiting or totally preventing the occurrence of the conditions which produce such detonation.

The advantages of detonation control in aviation fields likewise is impressively shown by the large resultant savings in fuel and the consequent increase in pay load or cruising range when the fuel air ratio is properly controlled. Tests on aircraft engines conducted with apparatus constructed according to the present invention have shown fuel consumption savings averaging close to 20%, and in some instances as high as 30%, over engine operation controlled according to generally-used and commercially available mixture analyzers. A modern four-engine airliner having a gasoline capacity of 14,400 lbs. and a pay load of 10,000 lbs. with a saving of 20% in fuel consumption may increase its pay load by 2,880 lbs., an increase of 28%, without reduction in cruising range.

Present manual methods of suppressing detonation are generally unsatisfactory for the reason that known detonation indicators provide unreliable information to the aircraft pilot. Such indications as the color of the exhaust flame, enginehead temperature, the sound of the engine, or the intermittent operation of a flasher or other electrical signals are unsuitable because even when reliable, require the constant attention of a pilot, and detract from the performance of his other duties. Furthermore, personal error in interpreting such indications is relatively great. For example, the appearance of the exhaust flame, is affected by such factors as the surrounding illumination level, engine speed and power, and presence of oil vapor in the exhaust gases, in no sense determinative of detonation. Electrical flashers may respond at various levels of detonation, as well as to extraneous noise energy, and hence involve a high degree of personal error when the pilot attempts to distinguish between true and false detonation signals. At best these signalling devices require close attention by the pilot and yield little indication of the severity of detonation apart from the frequency at which detonation occurs. Even if detonation severity were indicated in terms of the intensity of a light signal, it would not provide sufficiently accurate information by which the combustion mixture might be adjusted reliably because the pilot could effect a correction only on the inadequate basis of trial and error. The highly critical nature of the fuel-air ratio adjustment may be inferred from tests conducted with the present equipment indicating a detonation rate increase from 5 to 31 per minute with a change of only 0.05% in the fuel-air ratio. Unless a sensitive and reliable detonation control system is available therefore, it is necessary to operate aircraft engines with uneconomically rich mixtures to guard against the serious effects of detonation.

The foregoing disadvantages of manual control have been satisfactorily overcome by the present invention with apparatus that precisely evaluates the severity of detonation and provides a continuous graduated indication of such severity, at all levels of power output, from which indication the required corrective action may be evaluated accurately. Although the invention thus provides a suitable indicator for manual control purposes, the apparatus additionally includes automatic control means, whereby combustion conditions may be maintained within a narrow maximum efficiency range, with a preciseness unattainable with purely manual methods.

Automatic detonation suppression systems have been devised that operate generally on the principle that detonation signals may be utilized to control detonation, as a function of fuel-air ratio, ignition timing, fuel grade, or other factor controlling detonation. While these systems have operated with varying degrees of success no system is known that fulfills all the requirements of commercial acceptability. Among the principal defects of prior known automatic systems may be mentioned:

1. Inability to distinguish detonation signals from electrical noise or other extraneous energy;
2. Inability to correct detonation conditions as both a function of frequency and severity;
3. Inability to distinguish between a low-level detonation signal and a high-level normal combustion signal;
4. Insensitivity to incipient detonation, e. g., one to five exhaust flashes per minute, at which stage the detonation is not noticeably harmful;
5. Inability to provide full correction for all conditions within a small time interval;
6. Unstable responsiveness under varying engine load conditions, and during different operating periods;
7. Excessive size or weight;
8. Susceptibility to supply voltage variations of up to 15%, or large temperature ranges encountered during flight.

Each of the foregoing defects has been separately encountered and successfully overcome in the development of apparatus now to be more fully described.

One of the principal objects of the present invention is to provide improved methods of and means for suppressing detonation occurring within an internal combustion engine, in a manner that overcomes one or more of the previously enumerated defects.

Another object of the present invention is to provide an improved regulating system which will be responsive to the operating conditions of the cylinders of a prime mover and which will automatically adjust the combustion controlling conditions, carburetor valves for example, to so control the combustible mixture supplied to the engine cylinders as to keep the engine constantly operating on a combustion mixture which is no richer than is necessary to prevent the development of damaging detonations within the engine cylinders. By this means, the range of an aircraft whose engines are thus controlled may be extended to the maximum point consistent with safe engine performance.

An important object of the invention is the provision of both manual and fully automatic control systems for regulating the ratio of fuel to air supplied to the engine, thus permitting manual control by the pilot when so desired, which in the case of aircraft may be necessary during the take-off period in order to enable the craft to quickly and safely rise above surrounding objects, and control by an improved automatic control system during normal straight away flight when operation at maximum fuel economy is highly desirable for extending the range and reducing the cost of operating the aircraft.

A further object of the invention is to provide standardized indications or measurements of the intensity of the detonation occurring within an internal combustion engine in order that a more uniform procedure may be adopted in applying corrective measures for the elimination or prevention of detonation.

A further and important object of the invention is to provide a means for controlling the combustion of prime mover power plants which will operate as satisfactorily when the engine is developing only a fractional part of its rated capacity as when it is developing its full rated capacity.

Another object of the invention is to provide a control system capable of integrating several successive detonation impulses and providing an effective controlling force which corresponds with the summation of the successive detonations integrated over a definite time interval.

Other objects, advantages, and structural details of the invention will become apparent from the following description taken in connection with the accompanying drawings, wherein Fig. 1 is a diagrammatic representation of an embodiment of the invention particularly adapted to the control of aircraft engines;

Figs. 8 and 9 show representative oscillograph traces for typical aircraft engine performance at a relatively low power level during the combustion portion of an engine cycle;

Figs. 10 and 11 show representative oscillograph traces of aircraft engine performance at a relatively high power level during the combustion portion of an engine cycle; and Figs. 12 and 13 are diagrams of detonation pulses of differing severity.

The present invention works upon the general principle of utilizing abnormal combustion effects, such as temperature, sound, structural vibration or other characteristics of incipient detonation within the engine cylinders for developing electrical signals varying with the intensity and duration of the detonation, and utilizing these signals to operate a detonation control, e. g. to vary the fuel mixture supplied to the engine in such a way as to minimize the time during which conditions favorable to serious detonations are permitted to prevail, or to provide a graduated indication of the severity of the detonation from which the extent of the necessary correction may be directly perceived. The signals are preferably compensated for extraneous factors such as changing power output level, that might introduce error into the system operation.

Abnormal detonation conditions may be suppressed with the present invention by actuating any conventional control regulatory of detonation, typically by the methods outlined in W. Van Dijck Patent 2,220,558, granted November 5, 1940. For the sake of simplicity, the present invention has been disclosed in connection with a fuel-air mixture adjuster, since such a control arrangement requires little or no change in existing engine equipment.

Figure 1:
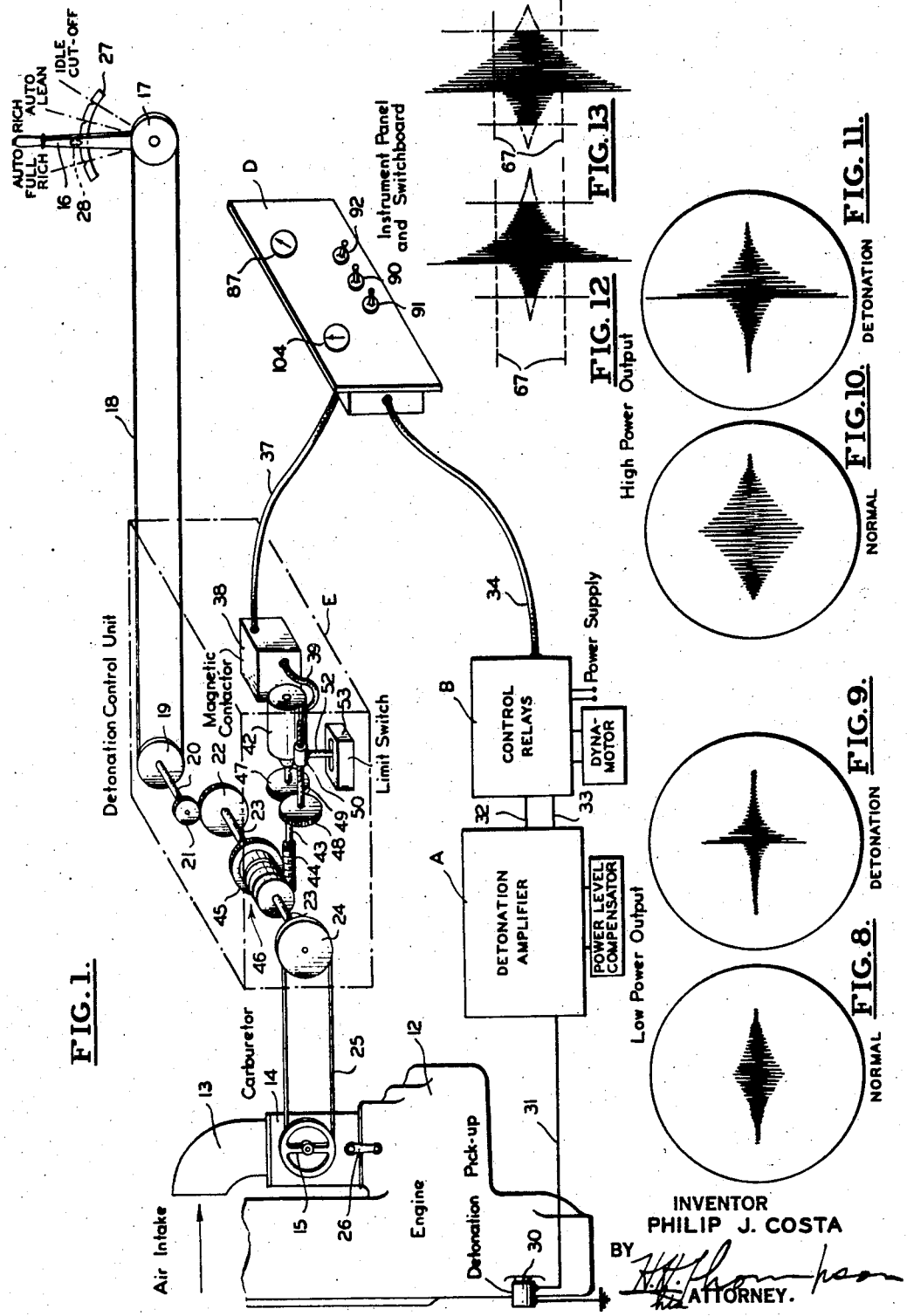

As schematically indicated in Fig. 1, the apparatus is shown applied to a conventional aeroplane engine 12, including the usual air intake manifold 13 and carburetor 14. Carburetor 14 contains a fuel mixture control valve (not shown) which is opened or closed by pulley-operated mixture control lever 15, shown external to carburetor 14. The position of mixture control lever 15 determines the fuel-air ratio of the mixture supplied to the intake of the engine at any given time. The position of mixture control lever 15, in the usual manual control system, is determined by the position of the pilot's manual control lever 16 with which it is suitably mechanically interconnected. A suitable arrangement comprises pulleys 17 and 19 interconnected by a cable 18.

Pulley 19 is permanently connected to pulley or sheave 24 by shafts 20 and 23 and speed-reduction gearing 21 and 22. A cable 25 connects sheave 24 with the detonation control member, such as fuel-mixture control lever 15. A gear 45 may be locked to shaft 23 by a clutch 46 to provide automatic control of lever 15 as will appear. The pilot's manual control lever 16 usually is provided with a notched sector 27, and a detent mechanism 28 which permits positioning control lever 16 in any one of the usual control positions between the "full rich" position and the "idle cut-off" position, shown as the limiting positions of control lever 16. The speed and power output of the engine may be controlled by a throttle 26 in the usual manner.

Attached to one of the cylinders of engine 12 is a detonation pick-up transmitter 30 which may be of any known type capable of detecting detonation conditions, e. g. by converting structural vibrations of the engine cylinder head, cylinder pressures, or their derivatives, into electrical pulsations. The pick-up 30 ordinarily comprises a transducer operating on well-known electromagnetic or magnetostrictive principles and may be of the general type shown in C. S. Draper Patent 2,275,675 dated March 10, 1942. This pick-up may be mounted on one or more of the engine cylinders, or at some central location on the engine representative of detonation conditions. The electrical pulsations or signals created by pick-up 30 are fed over electrical connection 31 to a detonation or pick-up signal amplifier A, more particularly described in connection with Fig. 2. From this amplifier the signals are fed over electrical feeders 32 and 33 to a control relay unit B of the apparatus of the invention. From the unit B, the control signals are passed over the wires contained in electrical cable 34 to an instrument panel and switchboard D which provides for the proper switching of the various circuits as well as providing the necessary detonation indications for the use and guidance of the pilot as will be more fully described. From this instrument panel and switchboard D, the control signals are fed over the wires of electrical cable 37 to an automatic detonation control unit E, where they control the operation of a suitable servo unit such as a reversible electric motor 42. A mechanical transmission comprising motor shaft 43, gears 44 and 45, operate shaft 23, wheel 24 and cable 25 to control the position of combustion mixture control lever 15 when magnetic clutch 46 is energized. The motion imparted to combustion mixture control lever 15 by motor 42 is confined within limits determined by the limit switch 53 having an actuator 50 movable along a lead screw 49 as the screw is rotated by gears 47 and 48 from shaft 43. An arm 52 on actuator 50 opens the respective limit switch contacts 99 and 100.

Detonation amplifier A to which the detonation pick-up 30 feeds its signal may comprise several conventional stages of audio frequency amplification arranged in cascade, including suitable coupling condensers, resistors, and power supplies for the plate and heater circuits. The amplifier A is responsive to all essential frequencies transmitted by the pick-up 30, e. g. throughout the audio range and into the supersonic range. The output signals may be used to provide both an indication of detonation and an automatic correction of abnormal detonation conditions. It will be apparent that means must be provided to segregate the output signals representing detonation conditions from those representing normal combustion conditions in order that the detonation controlling means may be responsive only to detonation conditions.

Various circuits may be used to segregate detonation signals from normal combustion signals. A comparison of Figs. 8 and 10, on the one hand, with Figs. 9 and 11, on the other hand, indicates that under both low-power and high-power output conditions the detonation signal is distinguished from the normal signal by a steep wave front, generally acknowledged to be caused by a rapidly accelerating pressure wave in the combustion chamber, when combustion occurs under conditions favoring detonation. While the envelope of the signal as seen on a cathode ray tube may be defined by a carrier wave in the audio region, for example, at 5,000 to 10,000 cycles per second, the steep wave front of a detonation signal may include higher order derivative frequencies, possibly as high as 50,000 to 100,000 cycles per second. Thus, the detonation components of the signals may be segregated from those characteristic of normal combustion as a function of the frequency differential, typically by passing the signals through suitable band-pass filters. This method of segregating the signals may be undesirable, since it does not adequately distinguish high frequency detonation components from extraneous electrical noise created by electrical generating equipment or extraneous engine vibration occurring during the combustion cycle. While these noise effects may be minimized by commutating the amplifier in the general manner disclosed by J. H. Lancor, Jr., Patent 2,291,045, dated July 28, 1942, such a method does not eliminate noise energy occurring during the combustion cycle.

Amplitude-segregation of the detonation components from the normal components was considered and tried originally with only moderate success, the principal shortcoming being due to the fact that a detonation signal at low-power levels, as shown in Fig. 9, might have the same maximum or average amplitude as a normal combustion signal at high-power output, as shown in Fig. 10. It was attempted to compensate the signals from the amplifier A for changing power output of the engine, so that the signals in effect all would be amplified to a common predetermined level. Early efforts at compensation, comprising rectifying the output of amplifier A and averaging the intensities to form a substantially uniform gain-controlling signal were not entirely successful, because the amplifier then failed to discriminate properly between normal combustion signals and signals representing detonation conditions.

It was recognized that under most efficient operating conditions, the signals are almost exclusively of the normal type illustrated in Figs. 8 and 10, and that only an occasional detonation signal occurs. Normal automatic control preferably limits detonation to an incipient condition, e. g. several occurrences per minute, at which condition no apparent detrimental effects are observable. It was thereupon perceived that signal strength variations might be eliminated by limiting the amplitude of the output signals from the amplifier A to establish an operating level for the gain control signals, while allowing the abnormal amplitude signals indicative of detonation to spill over into an auxiliary control circuit for detonation suppression purposes. A simple circuit incorporating the foregoing principles is disclosed in Fig. 2 and in practice has proven remarkably effective for all levels of engine power output despite the simplicity of the circuit. The amplifier output connection 54 extends to a voltage limiting device 63, such as a gaseous discharge tube having a flashing potential at substantially the desired limiting voltage, e. g. at the amplitude of the desired normal combustion signals. The limiter 63 ordinarily is a high impedance device of the order of many megohms, and accordingly may be shunted by a relatively high resistance 60 of the order of ten megohms, to preclude the building up of stray voltages that might cause operation of the limiter at times other than during detonation. A relatively low resistance load 61, e. g. of 10,000 ohms is connected in series with the parallel path provided by resistor 60 and limiter 63.

The amplifier output connection 54 also extends to a rectifier 64 through a coupling condenser 55 and a series dropwire resistor 56. A suitable integrating or averaging network 65 may be used with the rectifier 64 to provide a smooth bias or gain-controlling voltage for one or more of the stages of the amplifier A. While a single diode 64 may be used in a conventional manner to provide the rectified signals for filter network 65, as when switch 107 is closed effectively removing diode 108 from the circuit, difficulties were encountered when the impedance of the filter network 65 properly was high compared with the leakage resistance 67 in and around the rectifier tube 64 of perhaps twenty megohms, in that the stored energy tended to discharge unduly through the leakage path during the reverse portion of each cycle. This condition was considerably improved by connecting diodes 64 and 108, as shown, in such a manner that the respective diodes were alternately conductive. One diode 108 is connected in series with the load circuit or storage network 65 providing a high impedance at point 109, while the remaining diode 64 is shunted directly to ground. Thus, current flows from the network 65 to the anode 57 of diode 108 during the negative portion of each cycle, so as to develop a bias or gain-control voltage between wire 58 and ground with diode 64 providing a D. C. path for the rectified bias producing current. This voltage may be regulated to satisfy individual requirements, as by varying grid-leak 59. During the ensuing half cycle when the phase reverses the tendency of the network 65 to discharge through the leakage path 67 may be reduced if the voltage from the amplifier is dissipated by substantially short-circuiting the output through anode 62 to ground, the conductive diode having a relatively low impedance of the order of 100 ohms. In cooperation with the signal generated by output stage of amplifier A, whose impedance may be of the order of 50,000 ohms, the low impedance provided by the second diode reduces the amplifier output voltage to substantially zero, and thereby appreciably limits the unloading action on the network 65. In actual practice, the short-circuiting diode has reduced the amplifier output voltage during alternate half cycles to a small fraction of one volt and has appreciably stabilized filter operation by increasing the bias voltage from 50% to 100%.

In operation, signals from the amplifier A charge the network 65 to a suitable bias voltage adjusted to produce amplifier output signals having a level, in the case of normal combustion signals, immediately below the flashing point of the limiter 63. Accordingly, as long as the engine operates in a normal manner, the limiter 63 does not operate, and, except for the leakage current through resistors 60 and 61, the signals pass through the rectifier 64. With flat A. V. C. action, the amplifier gain varies inversely with the strength of the limited signals, so that the output remains substantially constant irrespective of the engine power output, and signals otherwise of the type shown in Fig. 8 are amplified to the level of those shown in Fig. 10.

It will be apparent that any detonation signals will tend to rise above the normal output level, and in so doing will ionize the gaseous discharge tube 63. When once ionized, the device 63 provides a low impedance path for the signals and will build up an appreciable voltage across resistor 61, which voltage may be used for detonation control purposes in a manner to be described. During operation, the limiter 63 effectively drops the voltage appearing at output connection 54 to a value corresponding to the sustaining voltage for the tube 63, since the tube becomes non-conductive below this voltage, thereby effectively stripping the abnormal components from the amplifier signals. The sustaining voltage and the flashing voltage of the tube 63 may have an average value approximately at the desired normal amplifier output potential, so that even when detonation occurs, the voltage charging the network 65 remains substantially constant. Detonation signals thus do not materially affect the amplifier gain-control circuit. It will be apparent that ionization of the tube 63 is an indication of detonation, and use is made of this fact by employing as a limiter a gaseous discharge tube that flashes brightly, typically an inexepnsive neon tube rated at 110 volts and having a flashing potential in the neighborhood of 60 volts.

The average limiting output voltage is depicted by the lines 67 in Figs. 12 and 13, the area of the generally triangular portions of the envelope above and below these lines being a function of the intensity of detonation. With the circuit of Fig. 2, a measure of this intensity is obtained as the average of the voltage appearing across resistor 61, which may be utilized to control the detonation intensity indicator to be described. An alterating current signal appears across resistor 61 at each occurrence of detonation; but the signal lasts but a short time, e. g., 1/100 of a second, varying according to the intensity of the detonation, as indicated by the detonation components shown in Figs. 12 and 13. For the automatic control of detonation, it has been found possible to perform the desired correction action as a pure function of frequency of detonation once the detonation signals are amplified to a common level, since the desirable operating condition may be defined in terms of allowable detonation frequency.

Figure 2:
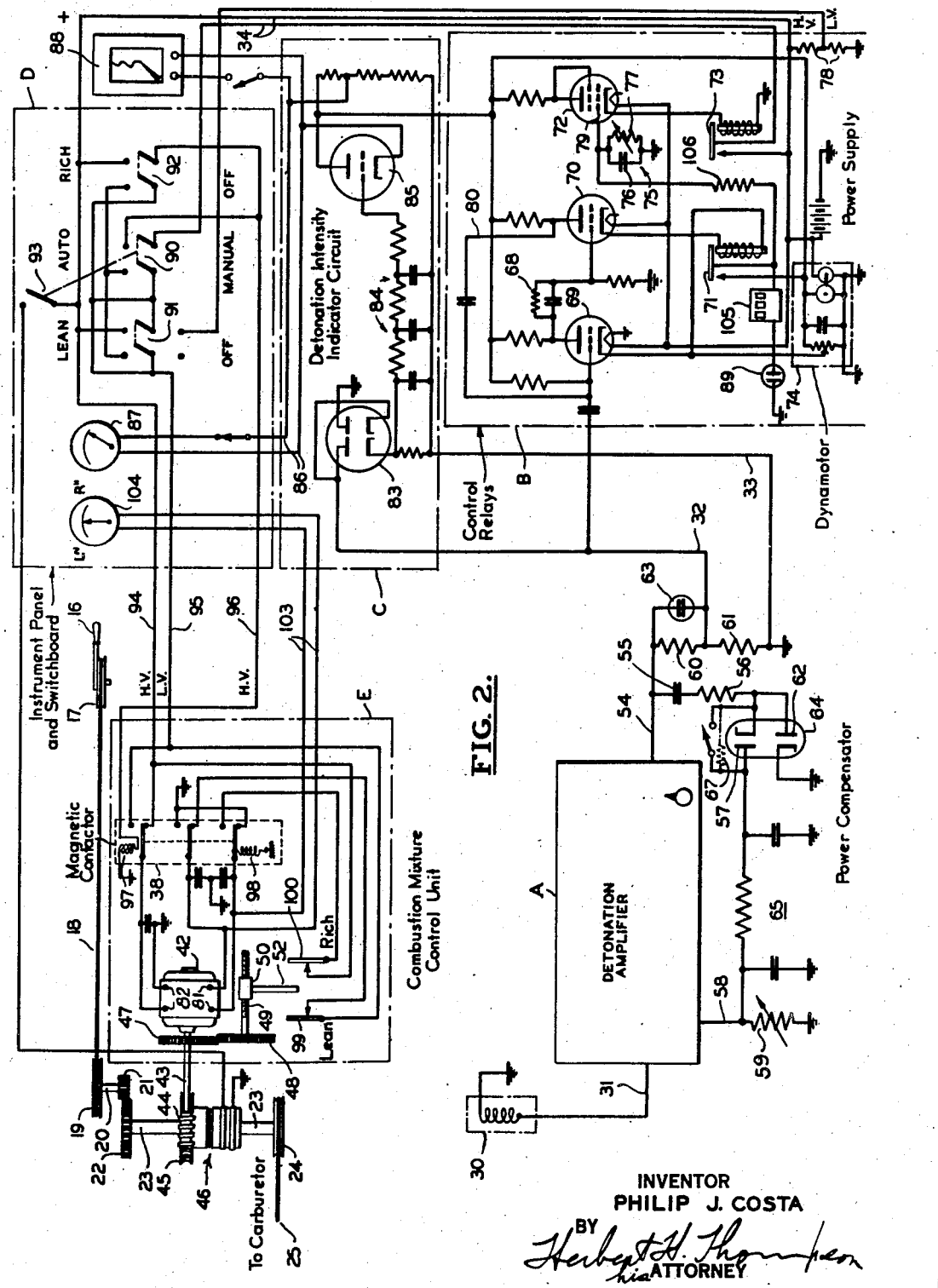
Fig. 2 is a detailed wiring diagram showing the component parts and the interconnections between these parts.

A typical control circuit is shown in Fig. 2, wherein unit B comprises principally a detonation-signal sustaining device capable of extending the life of each signal for a period suitable for the operation of the desired automatic control apparatus. By keeping the signal alive for a few seconds, it is possible to employ a positive-acting motor drive for the detonation controller, without rendering the operation unduly critical. A motor is desirable for the purpose, since it provides uniform speed and smooth action over the entire operating range, and is practically unaffected by large swings in operating voltages, temperatures, and humidities. The motor may be driven from the main power supply, typically a twelve-volt or a twenty-four-volt storage battery, illustrated in Fig. 2.

Figure 4:
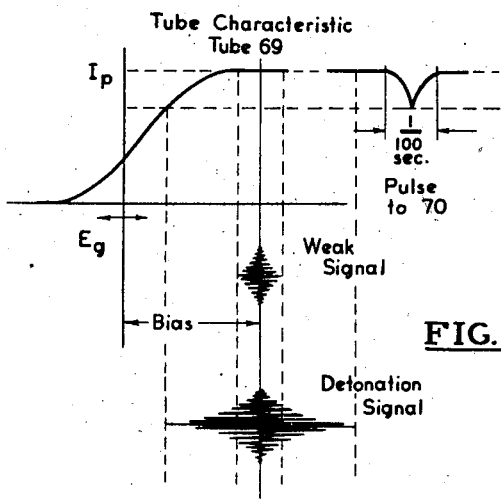
Figs. 4, 5, 6 and 7 are graphs showing the characteristic curves of the electron tubes used in the relay control unit.
Figure 5:
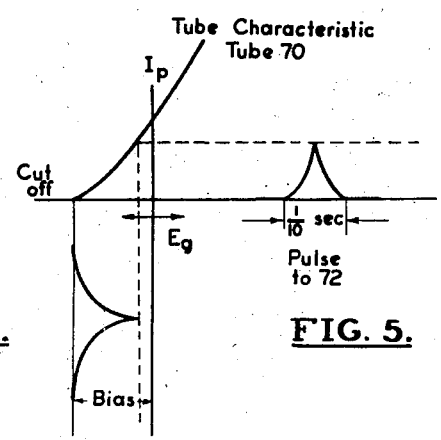
Figure 6:
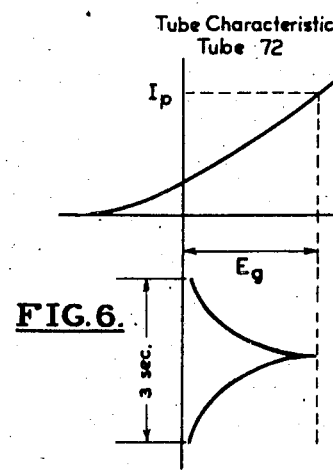

The signal appearing across resistor 61 is applied to the grid of tube 69 through a coupling condenser as shown. Although the tube connections are most clearly shown in Fig. 2, the operation of tube 69 and of tubes 70 and 72, to be described, may best be understood by additionally referring to Figs. 4, 5, 6, and 7, which figures show the relationship between plate current and grid voltage over a time base. As shown in Fig. 4, tube 69 normally is positively biased to saturation so that its plate current is unaffected by small fluctuations in the grid voltage. When a signal of considerably larger magnitude is impressed on the grid, e. g., by the negative half of the detonation signal, the positive bias on the tube is momentarily decreased, causing a corresponding reduction in the plate current flowing from a suitable source of supply, such as the high voltage output of a dynamotor 74. The anode of the tube 69 is coupled to the grid of tube 70 through a load impedance or network 68, preferably comprising a resistor and condenser connected in parallel. The reduction in the plate current to tube 69, and the corresponding increase in plate voltage occasioned by the detonation signal, produce a momentary reduction in the cut-off bias on the grid of tube 70, which may persist beyond the duration of the detonation signal by virtue of the slow discharge of voltage across the load 68. As shown in Fig. 5, the time constant of the network 68 may be arranged to provide a grid signal and a corresponding plate signal lasting for a considerably longer time than the original signal, e. g., for one-tenth of a second. Current flowing through the tube is operative to close a normally open relay 71, thereby applying a signal to the control grid of tube 72. A feedback connection 80 including a series connected condenser extends from the anode of tube 70 to the grid of tube 69 and quickly restores tube 69 to its saturation condition as soon as the series connected condenser is charged by the plate voltage of tube 70, thereby cooperating with network 68 in controlling the interval during which relay 71 remains closed.

Figure 7:
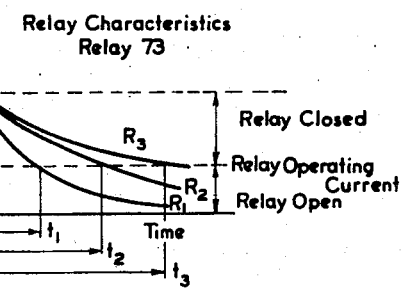

Whereas, tubes 69 and 70, and relay 71 are operative to sustain or delay the effective control signal for a period extending beyond the original signal, it is desirable to employ an additional stage in order to derive a control signal persisting for the required time, typically several seconds. The additional stage conveniently comprises a tube 72 having the coil of a relay 73 connected therewith. The tube 72 is normally biased to provide a quiescent plate current incapable of operating the relay. The grid circuit is provided with a resistor-capacitor network 75 comprising a resistor 77 and a condenser 76 which may be energized to render the tube 72 sufficiently conductive to operate relay 73 when a detonation signal appears. This may conveniently be done by connecting the network 75 through a protective resistor 106 and relay 71 directly to a positive supply voltage such as the power supply battery or the high voltage supply. Since the relay 71 is energized but momentarily, the network 75 does not have an opportunity to become fully charged. The network 75, however, is operative to keep the relay 73 closed for the desired length of time, the actual time interval being a function of the intensity of the detonation signal and corresponding energy flow to network 75, and the time constant of the network 75. As shown in Fig. 7, the relay may be closed for periods $t_1$, $t_2$, and $t_3$, longer or shorter than three seconds for a given charge by varying the resistance 77 to values corresponding to $R_1$, $R_2$, and $R_3$. The operating period of relay 73 may be rendered substantially independent of the intensity of detonation by omitting resistor 106, assuming, of course, that the positive voltage supply for the network 75 and grid 79 is not excessive.

A voltage divider 78 may be connected across the terminals of the main power supply of the aircraft to provide two distinct power supply circuits for connection to the armature and field windings of combustion mixture control unit motor 42. In this simple manner, the motor may enrich the mixture quickly and tend to lean the mixture slowly. For the purposes of this description these power supply circuits are designated as the high voltage power supply, H. V., and the low voltage power supply, L. V.

Power under the control of relay unit B is supplied through conductors 34 to the instrument panel and switchboard D and thence to the combustion mixture control unit E. As shown in Fig. 2, switchboard D includes one double-pole, double-throw switch and two double-pole, single-throw switches designated as leaning switch 91, automatic-manual changeover switch 90, and enriching switch 92. A fourth switch 93, which is a single-pole, single-throw switch may be ganged with switch 90 to apply energy to magnetic clutch 46 of the mechanical transmission assembly when the automatic manual changeover switch 90 is in the position that provides fully automatic control of combustion mixture control unit E, thereby to complete the driving connection from motor 42 to the shaft 23.

Automatic-manual changeover switch 90 provides connections between combustion mixture control unit motor 42 and the available power supply circuits, such that when this switch is in the manual position, both the field and armature windings of combustion mixture control unit motor 42 are energized from a single power supply, whereas with this switch thrown to the automatic position, the connections are such that the field winding and the armature winding of combustion mixture control unit motor 42 are connected to power supplies of different voltages, e. g. the field winding may be connected to the H. V. power supply when the armature winding is connected to the L. V. power supply, or vice versa.

Enriching switch 92 provides a means for energizing magnetic contactor 38 of the combustion mixture control unit E from the H. V. power supply when the controls are set for manual operation. Leaning switch 91 provides a means for disconnecting the armature and field windings of motor 42 from the low voltage power supply, leaving them connected to the high voltage power supply only when switch 90 has been positioned for manual operation.

Electrical conductor 94 carries the H. V. power supply to the motor 42 of the combustion mixture control unit and electrical conductor 96 carries the H. V. volt power supply to solenoid 97 of magnetic contactor 38, while electrical conductor 95 carries the L. V. supply to the terminals of motor 42. The connections between these power supply lines and motor 42 are controlled by the position of magnetic contactor 38 of combustion mixture control unit E.

Combustion mixture control unit E comprises two main component parts, the three-pole double-throw magnetic contactor 38 and the reversible electric motor 42, whose armature connections 81 and field connections 82 are brought out for separate excitation. The movable contacts of magnetic contactor 38, under the influence of spring 98, are normally in contact with the lower set of stationary contacts of the contactor, applying high voltage to the field and low voltage to the armature to produce low speed operation of motor 42 in a direction to progressively lean the fuel mixture. The movable contacts are pulled into contact with the upper set of stationary contacts of the magnetic contactor by the energizing of relay 73 and solenoid 97, applying high voltage to the armature and low voltage to the field, to produce high speed operation in the reverse direction, so as to quickly enrich the mixture.

In the connection between the armature winding of motor 42 and the H. V. power supply, there is inserted limit switch 100 which is designated as the enriching limit switch since it stops motor 42 after a predetermined period of operation in the enriching direction, preferably stopping motor 42 with combustion mixture control lever 15 in a position corresponding with the "full rich" position of the manual control lever 16. In the connection between the armature winding of motor 42 and the L. V. power supply, there is inserted limit switch 99 which is designated as the leaning limit switch since it serves to stop motor 42 after it has operated for a predetermined period of time in the leaning direction, preferably stopping motor 42 with the combustion mixture control lever 15 in a position corresponding with the "auto lean" position of manual control lever 16. This arrangement prevents returning combustion mixture control lever 15 to a position which would operate the engine below the knee or maximum economy point of the specific fuel consumption curve shown in Fig. 3 of the drawings.

It will be apparent that the detonation controller may be actuated manually by rotation of the sheave 24 either by shifting control lever 16 or by manually controlling the operation of motor 42. This provides the operator with complete control over the engine fuel mixture ratio so that he may operate the engine according to any desired points along the curves shown in Fig. 3. If maximum power is desired, as during take-off or climbing operations, the mixture control lever 15 may be adjusted to provide the corresponding specific fuel consumption required. In order to obtain maximum economy, however, the fuel mixture ratio must be maintained within extremely narrow limits. Ordinarily, maximum efficiency occurs in that operating region at which the engine is detonating incipiently, so that the detonation signals provide a suitable indicator by which the fuel mixture may be manually regulated. This may, in the simple case, comprise neon tube 63 which, by flashing during detonation, provides the pilot with an indication of abnormal engine operation, and allows him to enrich the fuel mixture until incipient detonation conditions are restored. Some personal error results in counting the flashes, since the brilliance of the flashes varies according to the intensity of detonation. This may be overcome in a large measure by applying a constant voltage for a predetermined interval to the indicator at each occurrence of detonation, typically by connecting a flasher 89 to the plate voltage supply whenever relay 71 is energized. A signal counter 105 may be energized in the same manner to provide a record of the detonations occurring during a measured period.

A more accurate determination of the detonation condition may be obtained by averaging or integrating positive or negative cycles of the detonation signals as they appear across resistor 61. Wires 32 and 33 conduct the signals to a rectifier 83 and filter network 84 of the same general type described in connection with the gain control circuit for amplifier A. A direct current amplifier tube 85 may be used to increase the strength of the averaged signals from network 84 and the output signals may be fed through wires 86 to an indicating meter 87 or to a recording type meter 88 to provide a numerical or graduated indication of the severity of detonation, measured as a function of both intensity and frequency of detonation. Thus, meters 87 and 88 are responsive to the area of the detonation component of the curves of Figs. 12 and 13, e. g. the portion outside the lines 67, and have been found to provide an accurate and reliable indication of the fuel rating. Meter 87 is so sensitive that it has been found responsive to otherwise imperceptible variations in the composition of incompletely mixed gasolines.

The operation of the invention may be understood from the following description. First let it be assumed that full manual operation of the combustion mixture control unit is desired. In these circumstances the pilot opens both automatic manual changeover switch 90 and switch 93, thereby disconnecting magnetic clutch 46 from the electrical power supply and rendering the automatic control features of the invention inoperative. The pilot may then operate lever 16 to position combustion mixture control lever 15 as he deems advisable based on his observations of engine performance, typically by observing indicator. Under these conditions, the control of engine performance is by completely manual means and the results obtained will be governed by the accuracy of the pilot's observations and his skill and dexterity in manipulating the controls.

If now greater accuracy in the operation of the mixture control for the purpose of insuring the maximum possible economy of engine performance is desired, this may be obtained by setting the controls of the invention for fully automatic operation. This the pilot may do by throwing the automatic changeover switch 90 and its associated switch 93 into the upper or automatic position and throwing leaning switch 91 and enriching switch 92 into their lower positions. With these switches thus arranged, the operation of magnetic contactor 38 and therefore of motor 42 will be under the control of the relays in control relay unit B as these may be triggered by signals obtained from detonation pick-up 30 and amplifier A.

Figure 3:
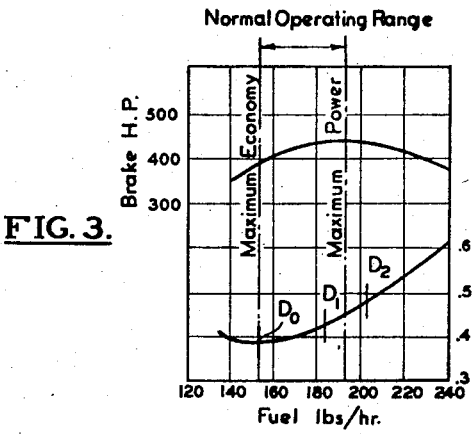
Fig. 3 is a diagram showing the load-fuel consumption curve of a typical aircraft engine.

With the controls in the position thus described, the field of motor 42 normally will be energized from the H. V. power supply and the armature of motor 42 will be energized from the L. V. power supply, the polarity of the connections being such that motor 42 normally will be operating in a direction to move combustion mixture control lever 15 slowly in the leaning direction and as long as no detonation occurs, motor 42 will continue operating in this direction, until stopped by the opening of limit switch 99. With combustion mixture control lever 15 thus positioned by switch 99 at the lean limit of its travel, the engine should be adjusted to operate at a point such as $D_0$, the low point of the specific fuel consumption curve as shown in Fig. 3, thus insuring operation of the engine at its maximum economy point as long as no detonation is encountered.

If, due to encountering sudden overload conditions or if for any other reason detonation occurs, the apparatus of the invention will operate to eliminate the detonation in the following manner. The mechanical vibration of the engine cylinder head or other function of detonation will be converted by pick-up 30 into an electrical voltage impulse which will be transmitted to amplifier A over electrical connector 31. In the detonation amplifier A this voltage impulse is amplified and impressed across load resistor 61. The magnitude of the voltage across load resistor 60 then being in excess of the break-down or flashing voltage tube 63 fires and a considerable increase in the current flowing through load resistor 61 takes place, with a corresponding increase in the I. R. voltage drop across this resistor. A voltage impulse is thereby created which is conveyed to the grid of tube 69 of control relay unit B closing relays 71 and 73, and accordingly solenoid 97.

This results in pulling the movable contacts of magnetic contactor 38 into contact with the upper stationary contacts. This operation interchanges and reverses the connections of the armature and field windings of motor 42, the field winding thereafter being connected to the L. V. power supply and the armature winding to the H. V. power supply with the connections being of such polarity that motor 42 reverses its direction of rotation and thereafter operates at higher speed to move mixture control lever 15 in the direction to enrich the mixture supplied to the engine and thus to correct the conditions responsible for the occurrence of detonation. In practice it has been found that operating motor 42 many times faster in the enriching direction than in the leaning direction is desirable, and may thus provide a long period for the entire cycle that limits the frequency of detonation. Thus if the motor operates for three seconds in one direction and seventeen seconds in the reverse direction, the incipient detonation frequency is fixed at three occurrences per minute.

Combustion mixture control lever 15 continues moving in the enriching direction until either enriching limit switch 100 is opened by the operation of disengaging arm 52, or until solenoid 97 of magnetic contactor 38 opens as a result of the operating bias on control grid 79 of tube 72 leaking away to ground through resistor 77 to such an extent as to permit the plate current of tube 72, which is also the holding current of relay 73, to drop below the operating current of this relay, which thereupon opens, disconnecting solenoid 97 from the H. V. power supply.

If relay 73 drops out, deenergizing solenoid 97, spring 98 returns magnetic contactor 38 to its lower contact position again reversing and interchanging the field and armature connections of motor 42 and restoring its original direction of rotation i. e., the direction of rotation in which it moves combustion mixture control lever 15 slowly in the leaning direction. If, on the other hand, before relay 73 drops out, another detonation pulse is received through the amplifier and control relay units, extending the holding period of solenoid 97, motor 42 will continue its operation in the enriching direction until finally, either enriching limit switch 100 is opened or detonation dies away to an extent which permits relay 73 to open and return motor 42 to operation in the leaning direction, thus completing a cycle of operation of the controller.

With the apparatus of the invention adjusted for fully automatic control over the combustion mixture, it will be evident that the controller, in the absence of detonation, is constantly reducing the amount of fuel supplied the engine toward the leanest mixture obtainable without the occurrence of damaging detonation. If the mixture is made too lean or if sudden changes in load conditions bring about detonation, combustion mixture control lever 15 is quickly moved to enrich the mixture and thus promptly to eliminate the detonation. This will be made clear by reference to Fig. 3, showing a typical load-fuel consumption curve for an aircraft engine. On the specific fuel consumption curve of Fig. 3, there is indicated at $D_0$ the conditions which correspond to the position of combustion mixture control lever 15 at the time that leaning limit switch 99 stops motor 42. The controller is then adjusted to operate the engine under conditions producing maximum fuel economy. The controller will remain in this position as long as no detonation occurs. Upon occurrence of detonation, combustion mixture control lever 15 is quickly moved to a position such as $D_1$, or $D_2$ on the specific fuel consumption curve of Fig. 3, where the fuel supply is adequate to eliminate the detonation. It should be noted that the amount of movement of the control lever from $D_0$ in the direction of $D_1$ or $D_2$ is determined by the intensity and duration of the detonation and also by the characteristics of the timing circuit 75 in control relay unit B. In actual operation combustion mixture control lever 15 is constantly moving first in the enriching direction and then in the leaning direction, but it will be obvious that since it moves much faster in the enriching direction than it does in the leaning direction, the engine will be supplied with a mixture rich enough to prevent detonation during a greater portion of the time that it is in operation, thus practically insuring the absence of sustained detonation of damaging intensity. Since it has been demonstrated in practice that detonation of slight intensity and short duration will not damage an engine, the method of control provided by this invention will practically guarantee operation under conditions which are unfavorable to the development of damaging detonation within the engine while permitting maximum economy of fuel consumption.

As many changes could be made in the above construction and many widely different embodiments of this invention could be made without departing from the spirit or scope hereof, all matter contained in the above description or shown in the accompanying drawings should be broadly interpreted in an illustrative and not in a limiting sense.

Having described one embodiment of the invention with particularity, what is claimed is:

1. A combustion regulating system for a prime mover having combustion pressure enclosing chambers comprising combustion mixture controlling apparatus, and reversible motion producing means unaffected by temperature changes but responsive to detonation in said chambers for varying the adjustment of said combustion mixture controlling apparatus in correlation with changes in the intensity of said detonation.

2. A combustion regulating system for a prime mover having combustible mixture enclosing cylinders comprising a fuel-air proportioning controller, and motor driving means responsive to detonation in said cylinders and operative to move said fuel-air proportioning controller from an initial setting by amounts corresponding with changes in the intensity of said detonation, and thereafter operative in response to the restoration of normal combustion conditions in said cylinders to return said fuel-air proportioning controller at reduced speed to said initial setting.

3. A combustible supply regulating system for prime movers having combustible mixture enclosing cylinders comprising a combustion mixture proportioning controller, and motor driving means responsive to detonations in said cylinders and operative to alter the adjustment of said combustion mixture proportioning controller by amounts proportioned to the duration of said detonations.

4. A combustion regulating system for prime movers having explosion confining cylinders and a carburetor for regulating the combustion mixture supplied to said cylinders comprising reversible motorized driving means actuated by detonations in said cylinders for changing the setting of said carburetor in accordance with the varying frequency and intensity of said detonations.

5. A combustion mixture regulating system for power generating apparatus comprising a fuel-to-air proportioning controller, means sensitive to the prevalence of normal operating conditions in said power generating apparatus for causing said fuel-to-air proportioning controller to lean the mixture supplied to said power generating apparatus sufficiently to initiate detonation in said apparatus, and motor means responsive to said detonation for causing said fuel-to-air proportioning controller to enrich the mixture supplied said power generating apparatus in proportion to the intensity-duration characteristic of said detonations.

6. A combustion regulating system for a prime mover having a combustion mixture controller normally positioned for the maintenance of a lean combustion mixture in said prime mover comprising means responsive to detonation in said prime mover for producing impulses proportional to the intensity of said detonation, a circuit for transmitting and controlling said impulses, motor means operatively connected to said circuit for driving said combustion mixture controller, and relaying means responsive to said impulses for causing said driving means to reposition said combustion mixture controller so as to alter the supply of combustibles to said prime mover by amounts determined by the intensity of said detonation.

7. A combustion regulating system for a prime mover as claimed in claim 6, said relaying means including means for proportioning the running time of said means for driving said combustion mixture controller to the average intensity of detonation occurring in said prime mover during a definite time interval.

8. A combustion regulating system for a prime mover as claimed in claim 3, said driving means including a reversible electric motor adapted to operate at different speeds in opposite directions.

9. A combustion regulating system for a prime mover as claimed in claim 6, said transmitting and controlling circuit including energy interrupting means effective to stop said means for driving said combustion mixture controller when said driving means has brought said combustion mixture controller to a selected position.

10. A combustion regulating system for a prime mover having a combustion mixture controller comprising means for producing detonation responsive impulses, means for automatically increasing and decreasing the magnitude of said detonation responsive impulses in compensation of variations in the power output of said prime mover, and motor driving means responsive to said detonation responsive impulses for altering the adjustment of said combustion mixture controller in a manner to curtail detonation in said prime mover.

11. A method of regulating a combustible mixture fed to the cylinders of a combustion engine comprising forming impulses in response to detonation occurring within said cylinders integrating said impulses, and proportioning said combustible mixture in relation to said integrated impulses.

12. A method of regulating the combustion mixture supplied to a prime mover as claimed in claim 11, including automatically adjusting the magnitude of said impulses to a constant level irrespective of variations in the power being developed by said prime mover for producing equally effective regulation at any power output level within the capacity of said prime mover.

13. A combustion regulating system for a prime mover as claimed in claim 6, said transmitting and controlling circuit being arranged for actuation from multiple energy sources of different voltages, and including means for selectively connecting said means for driving said combustion mixture controller to said multiple energy sources for operating said driving means in different directions and at different relative speeds.

14. A combustion regulating system for a prime mover having combustion cylinders, comprising a combustion mixture controller, manually operative means for adjusting the position of said controller, power operative remote control means for adjusting the position of said controller, means responsive to detonation in said prime mover for producing signal impulses proportional to the intensity of said detonation, means for integrating said signal impulses over definite time intervals, and means for indicating the magnitude of said integrated signal impulses for guiding the operator of said prime mover in adjusting the position of said combustion mixture controller.

15. A combustion regulating system for a prime mover having combustion cylinders, comprising a combustion mixture controller, manually operative means for adjusting the position of said controller, means responsive to detonation in said prime mover for producing signal impulses proportional to the intensity of said detonation, means for integrating said signal impulses over definite time intervals, means for indicating the magnitude of said integrated signal impulses, and means for adjusting said mixture controller in response to said integrated impulses.

16. A prime mover combustion regulator comprising a combustion mixture controller, driving means responsive to detonation in said prime mover and operative to move said combustion mixture controller from an initial position by amounts corresponding with the duration of said detonation and in a direction to enrich the mixture supplied to said prime mover and thereafter operative in response to the cessation of said detonation to move said combustion mixture controller in a direction to lean the mixture supplied to said prime mover, and means for varying the operating time of said driving means in the enriching direction relative to the operating time of said driving means in the leaning direction.

17. A prime mover combustion regulator comprising a combustion controller, means responsive to normal operation of said prime mover for progressively actuating said controller in a manner to develop detonation in said prime mover, and means responsive to said detonation for actuating said controller by an amount proportional to the severity or intensity of said detonation and in a direction to eliminate said detonation.

18. In a detonation responsive device for an internal combustion engine, the combination comprising means for deriving combustion and detonation signals representing a function of operating combustion and detonation conditions within the combustion chamber of said engine, means for stripping from said combustion and detonation signals any portions representative of detonation, means for amplifying said signals, and means for controlling the gain of said amplifying means as an inverse function of the combustion signals remaining when said detonation-representative portions are removed.

19. In a detonation responsive device for an internal combustion engine, the combination comprising means for deriving signals representing a function of pressure variations within the combustion chamber of said engine, means for resolving said signals into normal-combustion amplitude components and existing abnormal-combustion amplitude components, means for amplifying said signals, means for controlling the gain of said amplifying means as an inverse function of said normal-combustion amplitude component of said signals, and detonation controller actuating means responsive to said abnormal components of said signals.

20. In a device for suppressing detonation in an internal combustion engine, the combination comprising amplifier means for deriving signals representing a function of combustion and detonation operating conditions within the combustion chamber of said engine, discriminating means for discriminating between combustion and detonation portions of said signals and for limiting the intensity of said signals to a level characterizing normal-combustion, and automatic gain control means operative on said amplifier means in response to said limited signals.

21. Combination as claimed in claim 20 wherein said automatic gain control means includes an integrating circuit comprising a filter network, and a twin diode having a first anode and cathode energized by alternating current from said amplifier means, a second anode and a second cathode connected in series with said filter network and with said amplifier means, said second cathode being connected to said first anode.

22. A method of controlling an internal combustion engine, comprising deriving signals representing a function of a vibration condition of the combustion chamber of said engine, compensating said signals for changes in the power delivered by said engine, removing from said signals components representing detonation, and controlling detonation in response to said components.

23. A method of controlling an internal combustion engine, comprising deriving signals representing a function of pressure variations within the combustion chamber of said engine, stripping said signals of abnormal-amplitude components characteristic of detonation conditions in said chamber, compensating said derived signals for changes in the power output of said engine as an inverse function of the intensity of said stripped signals, and controlling said detonation conditions in response to said components.

24. A method of controlling an internal combustion engine, comprising deriving signals representing a function of a vibration condition of the combustion chamber of said engine, stripping said signals of abnormal-amplitude components representing detonation conditions in said chamber, compensating said derived signals for changes in the power output of said engine as an inverse function of the intensity of said stripped signals, averaging the intensity of said components, and controlling said detonation conditions in response to said averaged components.

25. A method of controlling an internal combustion engine, comprising deriving signals representing a function of pressure variations within the combustion chamber of said engine, stripping said signals of abnormal amplitude components characteristic of detonation conditions in said chamber, electrically maintaining the normal combustion level of said engine substantially constant without utilizing said abnormal amplitude components, compensating said derived signals for changes in the power output of said engine as an inverse function of the intensity of said stripped signals, averaging the intensity characteristics of said detonation components, and providing a graduated indication of the strength of said averaged components.

26. Apparatus for automatically suppressing detonation in an internal combustion engine, comprising means for deriving signals representing a function of pressure variations within a combustion chamber of said engine, means for compensating said signals for engine power output variations, means for segregating from said compensated signals components representing detonation conditions in said chamber, and detonation-control actuating means responsive to said components.

27. Apparatus for automatically suppressing detonation in an internal combustion engine, comprising means for deriving signals representing operating conditions of a combustion chamber of said engine, means for compensating said signals for engine power output variations, means for segregating from said compensated signals components representing detonation conditions in said chamber, and detonation control means responsive to said components, said detonation control means including a combustion controller, and driving means triggered by each detonation component of predetermined magnitude, said driving means being operative during a predetermined time interval thereafter to move said controller in a direction to suppress detonation.

28. Apparatus for automatically suppressing detonation in an internal combustion engine, comprising a vibration pick-up mountable on the outer wall of a combustion chamber of said engine, means for compensating the signals from said pick-up for engine power output variations, means for segregating from said compensated signals components representing detonation conditions in said chamber, a combustion mixture controller, first means operable on said controller during normal combustion conditions to induce detonation conditions progressively in said chamber, and second means triggered by each detonation component of predetermined magnitude and operative on said controller during a predetermined time interval large as compared with the duration of said component to dispel detonation conditions progressively in said chamber.

29. Apparatus as claimed in claim 28 wherein said second means operates on said controller at a fixed higher speed than said first means.

30. Apparatus for automatically suppressing detonation in an internal combustion engine, comprising means for deriving signals representing vibration originating within a combustion chamber of said engine, means for compensating said signals for engine power output variations, means for segregating from said compensated signals components representing detonation conditions in said chamber, and detonation control means responsive to said components, said detonation control means including detonation component averaging means, and a detonation intensity indicator continuously responsive to the output of said averaging means.

31. A detonation intensity indicator for an internal combustion engine, comprising a vibration pick-up for the combustion chamber of said engine, means for compensating the signals from said pick-up for engine-power output variations, means for segregating from said compensated signals components representing detonation conditions in said chamber, means independent of said segregating means for maintaining the normal combustion level of said engine substantially constant, means for integrating said components, and a current meter responsive to said integrated components and being graduated according to intensity of detonation.

32. Detonation suppression apparatus for an internal combustion engine, comprising a transducer responsive to vibration within said engine for producing electrical signals representing detonation pulses within said engine, detonation control means responsive to said signals and operative for an adjustable period exceeding the duration of said signals to progressively increase the fuel-air ratio of the combustible mixture to said engine.

33. Detonation suppression apparatus for an internal combustion engine, comprising a transducer responsive to vibration within said engine for producing electrical signals representing detonation pulses, within said engine, detonation control means responsive to said signals and operative at least for the duration of said signals to progressively increase the fuel-air ratio of the mixture to said engine, and delay means for prolonging said signals for an arbitrarily chosen period whenever said pulses exceed a predetermined minimum amplitude level.

34. In apparatus for suppressing detonation in an internal combustion engine, the combination comprising pick-up means for deriving signals representing the operating condition of a combustion chamber of said engine, means for compensating said signals for engine power output variations, means for segregating from said compensated signals components representing detonation conditions in said chamber, means independent of said segregating means for maintaining the normal combustion level of said engine substantially constant, and means for forming a permanent record of said components as a function of time.

35. In apparatus for suppressing detonation in an internal combustion engine, the combination comprising pick-up means for deriving signals including detonation and combustion components representing a function of engine operating conditions, means for compensating said signals for engine power output variations, means for stripping from said compensated signals of combustion and detonation those components representing detonation conditions in said engine, a constant intensity signal device, and means responsive to components of at least a predetermined magnitude for actuating said signal device.

36. Apparatus for automatically suppressing detonation in an internal combustion engine, comprising pick-up means for deriving signals representing vibration conditions of a combustion chamber of said engine, means for compensating said signals for engine power output variations, means for segregating from said compensated signals components representing detonation conditions in said chamber, and detonation control means responsive to said components, said detonation control means comprising an adjuster of the fuel-air mixture for said engine, said adjuster having a limiting stop set to inhibit movement of said adjuster immediately beyond the point corresponding to maximum fuel economy.

37. Apparatus for automatically suppressing detonation in an internal combustion engine, comprising pick-up means for deriving signals representing a function of operating variations within a combustion chamber of said engine, means for compensating said signals for engine power output variations, means for segregating from said compensated signals components representing detonation conditions in said chamber, and detonation control means responsive to said components, said detonation control means including electric motor driving means having fixed operating speeds independent of changes in temperature and pressure.

38. Apparatus for automatically suppressing detonation in an internal combustion engine, comprising means for deriving signals representing a function of pressure variations within a combustion chamber of said engine, means for compensating said signals for engine power output variations, means for segregating from said compensated signals components representing detonation conditions in said chamber, and detonation control means responsive to said components, said detonation control means including a combustion controller, and driving means triggered by each detonation component of predetermined magnitude and operative during a predetermined time interval thereafter to move said controller in a direction to suppress detonation, said driving means having a constant driving speed over the entire operating range.

39. In apparatus for suppressing detonation in an internal combustion engine, the combination comprising pick-up means for deriving signals representing detonation and combustion components as a function of engine combustion conditions, reversible control means responsive to only the detonation components of said signals representing abnormal detonation conditions in said engine, and a constant intensity signal device actuated by said control means for producing a uniform indication of the occurrence of detonation.

PHILIP J. COSTA.

REFERENCES CITED

The following references are of record in the file of this patent:

(Other references on following page)

UNITED STATES PATENTS

| Number | Name | Date |
|---|---|---|
| 1,845,151 | Hubbard | Feb. 16, 1932 |
| 1,907,415 | Carpenter | May 2, 1933 |
| 2,192,863 | Hetzel et al. | Mar. 5, 1940 |
| 2,202,900 | Draper | June 4, 1940 |
| 2,220,558 | Van Dijck | Nov. 5, 1940 |
| 2,275,675 | Draper et al. | Mar. 10, 1942 |
| 2,319,219 | Draper et al. | May 18, 1943 |
| 2,337,522 | Eldredge | Dec. 21, 1943 |
| 2,340,714 | Traver et al. | Feb. 1, 1944 |

FOREIGN PATENTS

| Number | Country | Date |
|---|---|---|
| 552,098 | Great Britain | Mar. 23, 1943 |
| 553,523 | Great Britain | May 25, 1943 |